April 24, 1945.  D. R. YARNALL  2,374,403
RESILIENT PROTECTION FOR FLAT GAUGE GLASSES
Filed May 16, 1940
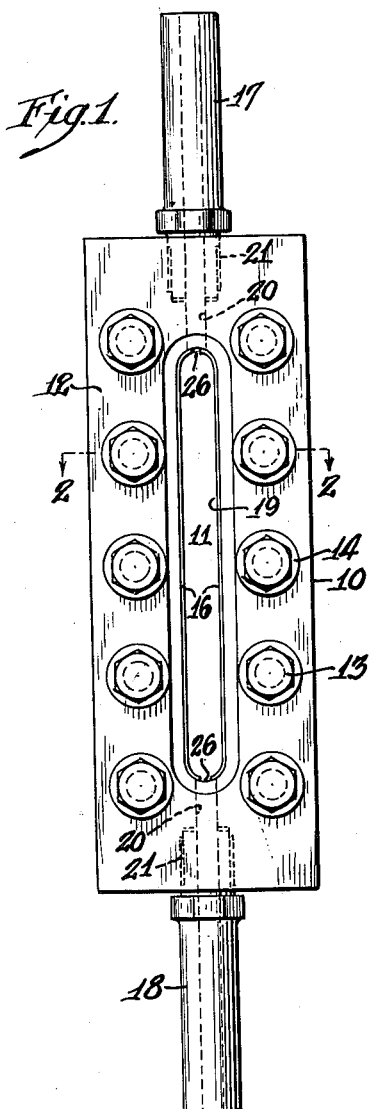
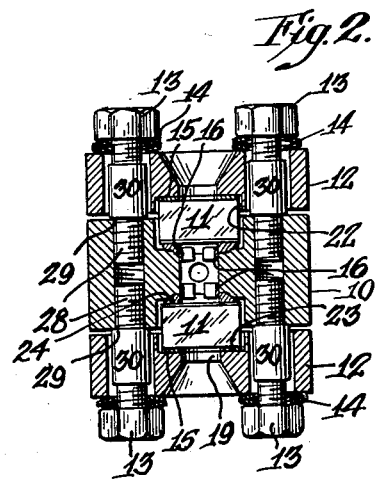
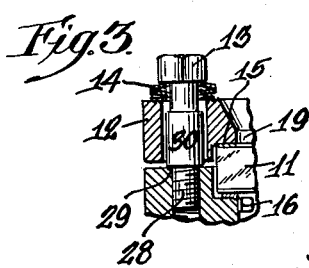
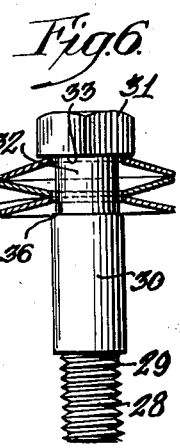
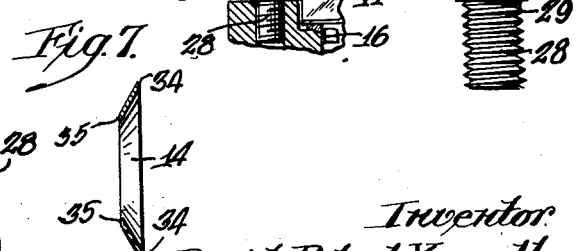
Inventor
David Robert Yarnall
by Attorneys
Witness:

Patented Apr. 24, 1945

2,374,403

UNITED STATES PATENT OFFICE 2,374,403

RESILIENT PROTECTION FOR FLAT GAUGE GLASSES

David Robert Yarnall, Philadelphia, Pa., assignor to Yarnall-Waring Company, Philadelphia, Pa., a corporation of Pennsylvania Application May 16, 1940, Serial No. 335,597

6 Claims. (Cl. 151—32)

The invention relates to bolts and spring washers assembled and protected against accidental disassemblage.

The invention is particularly directed toward means of holding spring washers in position with respect to the heads of bolts—whether the bolts are formed by fastening nuts on studs or deal with integral bolt heads.

A further purpose is to co-relate a spring washer upon a bolt with a facing intended to limit the extent to which a bolt thread enters a threaded opening.

A further purpose is to provide as an article of commerce a stud or bolt and spring cone assembly, with spring cones permanently but loosely mounted between the stud head and an outward shoulder of the stud.

Further purposes will appear in the specification and in the claims.

I have elected to show my invention in only a few of its forms, selecting forms, however, that are practical and efficient in operation and which well illustrate the principles involved.

Figure 1 is an elevation intended for a conventional showing of any structure to which my bolt and spring washer assemblages may be applied.

Figure 2 is a section of Figure 1 taken upon the line 2—2 thereof.

Figures 3 and 4 are fragmentary sections corresponding generally to Figure 2 but showing modifications.

Figure 5 is an assembly view of the holding means for a cover.

Figure 6 is an elevation of a stud and its associated parts, intended itself to embody a new article of commerce.

Figure 7 is a central transverse section of a conical spring.

Like numerals refer to like parts in all figures.

Describing in illustration and not in limitation and referring to the drawing:

The gauge structure illustrated comprises a body 10 to which flat glass plates 11 are held by covers 12.

In the form of Figures 1, 2, 3, 4, 5 and 6, studs 13 carry spring cones 14 by which the parts are held in place, resiliently pressing gaskets 15.

Though the invention is here shown in an assemblage in which the spring washers protect a gauge glass against excessive pressure, this is to be viewed as an illustration only since the invention applies to the placing of covers or plates of various characters in which the cover or plate must be protected against excessive or local pressure. The invention is not restricted to the water level indicator art but applied wherever bolts and spring washers of the character can be used.

In all of the forms retaining strips 16 restrain inward movement of the packing. Upper and lower conventional outlet nipples 17 and 18 are shown for connection to the steam and water spaces, respectively, of a boiler.

The body 10 is longitudinally through-slotted at 19 for an intermediate portion of its length forming a long straight slot with curved ends. The body is also bored and counterbored at its ends at 20 and 21 to receive the nipples 17 and 18. It is oppositely recessed at 22 and 23 about the through slot 19 to receive the flat glasses 11, and is formed at the bottoms of the recesses 22 and 23 to seat the endless gaskets 15. The bottoms are tapered so as to be shallower at the outsides than at the insides to provide outward flares at 24 so that the progressive outward constriction of the gasket space causes the high pressure within the gauge compartment to tighten the gasket in the space as it presses the gasket outwardly. The gasket seals against its tapered seat and against the inner face of the glass.

Applicant uses strips which are separate and which are welded against the inner edge of the indicator body or other body seen in Figure 1. The strips are not needed as much at the ends but may follow the curves at the ends. A space 26 is indicated between the opposing ends of the strips 16. This space may be large or small. It is intended to accommodate temperature changes during welding.

A principal feature of the invention is directed to bolt assemblages capable of applying resilient, limited, and predetermined compression of the covers 12 upon glasses 11; for example, and other places where such resilient holding means is sought. In the present structure it is desirable to secure right compression upon the glasses 11 despite small dimensional variations of any of the gauge members and despite any other small outward variation of either glass.

This resilient nicely balanced compression can be accomplished by resilient compensations in the individual holding members (here studs).

Each stud 13 comprises a threaded end 28, a shoulder 29 adjacent the thread, an enlarged section 30 which provides the shoulder, a head 31 by which the stud is screwed to place and a reduced cross-section or neck 32 between the enlarged section 30 and the inward face 33 of the head. Within the neck is located spring material. In Figures 2, 3 and 6 appear a plurality of spring cones 14 placed base 34 to base 34 or crown 35 to crown 35 so that they are cumulative in their spring effects. Two are used in Figure 2, and three in Figures 3 and 6. In another form (Figure 4) a spring 14' is used.

The shoulder need not be extensive. It need be enough definitely to set a limit to the seating of the studs, as distinguished from allowing the extent of insertion of the studs to depend upon the uncertainties of the cutting of the thread. Excellent results have been secured with but a few hundredths of an inch of shoulder.

The inner diameter 36 of the inner cone considered as a retaining washer, or of the spring, is such that it fits loosely upon the neck portion of the stud but is too small to slip off from the stud.

Where the head is originally separate and has been added (Figures 2 and 4) this inner diameter 36' may be quite noticeably smaller than either the enlargement or the head and the cones may be applied before the head is applied. This offers opportunity for individual adjustment of the pressure.

The studs 13, together compressing the cover upon the glass 11, thread home into the body 10 until shoulders 29 engage the outer face of the body about the thread. Meantime spring cones 14, or springs 14' are compressed between inwardly directed (head) face 33 carried by the stud and the surface of the cover about the stud. The inwardly directed face 31 of the stud most conveniently corresponds with the inwardly directed shoulder.

It will be seen that each stud assembly comprises a stud 13 providing an inwardly directed shoulder that determines the operating position of the stud when threaded into the body, and a head setting a predetermined distance allowed for cover thickness and compression spring cones or spring. Moreover the group of spring cones 14 or spring is kept in assembly with the stud.

While intended for any use to which they may be adapted it is believed my stud and spring cone assemblies have their widest application in removably bolting down miscellaneous covers, flanges, heads and the like. They serve the purpose excellently in holding on the covers and protecting the glasses in flat glass liquid level gauges.

The present invention is intended primarily for the establishment and maintenance of uniformity of pressure within such limits as shall protect the parts held by a cover, for example, against unequal and excessive pressure. It is intended also to compensate for the weaving of plate gauge glasses caused by the body of the gauge heating up first and the heating of the cover lagging sufficienty to cause a slip between the body and the cover.

It is intended also to provide tolerances ample for avoidance of injury by reason of accidental variation of dimensions from the limits set.

The position of the stud head with respect to the shoulder engaging the body forms the limit to avoid excessive compression. The extent of compression of the spring cones or springs used must be such as, with the variations met with in practice in expansion etc., avoids excessive compression with maximum stress on the one hand and insures that with minimal stress there shall not be low enough pressure to permit leakage.

After standardization of equipment, determining extents of compression of packing at the pressure contemplated, extents of compression of springs for these pressures, number of cones or length of springs desirably used, and, as derived from them, over-all spacing between the shoulders of the stud and the under sides of the heads, the studs can be duplicated as standard for the equipment thus tested. However, the tests for a new piece of equipment are simple in determination of the spacing to be given between the shoulders and the under sides of the head either for all the studs of this new equipment or for individual studs, if for any reason it be desired to give them different characteristics.

In practically determining the stud dimensions the best means known by me is based upon use of a stud of which an example is shown in Figures 2 and 4 having a thread at each end, an intermediate enlargement forming a shoulder and a neck above the intermediate enlargement. This stud is screwed "home" so as to shoulder against the body, and the packing and cover are put in place over the stud. The cones or spring desired are or is mounted over the outer thread and a nut is screwed down upon its outer thread until, as determined by the wrench leverage and the pressure applied, the desired spring pressure has been reached. The position of the nut upon the screw is then marked for duplication after removal of the nut and stud, or the nut and stud are drilled and pinned together as in Figure 4 to set the nut. The stud is removed and the nut is welded to the stud at the desired position or the position to which the nut is set by the pin is maintained. In either event this individual stud will then serve the purpose at the position at which it has been set or if the studs are to be uniform may be used as a model for the production of other studs. The number of spring cones used or the length of spring applied depends upon the intended tolerance. For example, if the range of compressive distance by which compression of a single cone may be acceptable be a sixty-fourth of an inch a single cone would give but a sixty-fourth inch of permissible variation, whereas the two cones of Figure 2 or the three cones of Figures 3 and 6 would give a thirty-second of an inch of three-sixty-fourths inch permissible variation, respectively. For the same reasons additional coil length of any given spring increases the tolerance in the use of that spring.

In the unusual case where the studs are to be differently set for the same cover the procedure above can be followed and the individual studs as determined can be marked for their selected positions.

Where, as in Figures 5 and 6, the "head" is integral with the bolt, and the dimensions of standard bolts for the particular piece of equipment under test is sought, a sample is made by insertion of a trial bolt of which the head is left "long" initially. The cones or spring are or is passed over the enlargement 30 and are tightened against the cover. If it be seen that the cones or spring are or is unduly compressed in screwing the stud home, the under face of the head is cut away until the distance is right and this stud is used for a sample. In the solid head structure the cones are made a tight enough fit over the stud shoulder so that, though they can be forced over to occupy the neck position they cannot be removed without application of considerable force and will not fall off. The spring, correspondingly tight over the shoulder, can be partially unwound for passage over the shoulder and merely resumes its coil tightness within the stud neck.

The data required for design of studs for new conditions may also be determined from a laboratory study of the characteristics of the elements involved. For example, the amount of compression of standard cones and springs for each of different pressures in pounds may be determined by experiment, as also the extent of compression of different packings at various pressures. Such information is also available from manufacturers of the materials. From this data and the thickness of the several comparatively incompressible parts the distance between the stud shoulder and the under face of the nut or head upon the stud is easily worked out.

The preferred form of spring material is the spring cone.

It will be evident that when the reduced portion next to the head is called a neck this does not indicate that there need be much difference in diameter between it and the enlargement bounding it toward the shoulder end of the stud or between it and the shoulder. It means merely that the enlargement or the shoulder, if it serve the purpose, shall be sufficient to prevent accidental removal of the cones or spring from the neck and that the neck shall be small enough for the cones or spring to move upon it without undue friction. As there is no advantage in making the neck a close fit within the cones or spring there is a considerable range of neck diameter which will be satisfactory.

It will be clear that the head performs two main functions; affording convenient wrench engagement for setting the stud so that the shoulder of the stud abuts against the outer surface of the body, and pressing against the outer end of the spring or a cone to accomplish the compression of the spring or cones. Where the smaller cone end of a spring cone extends outwardly the engagement with the cone to compress it will be satisfied by a very small engaging surface; and the function of providing wrench engagement can be satisfied by a variety of terminals well recognized in the stud art.

It will be evident that the means illustrated provides resilient protection for a flat glass insert against excessive pressure, protecting by intervention of resilient means for taking up and equalizing the pressure in the train of pressure between the threaded retaining devices (whether studs or bolts) and the glass and unifying the pressure as well as controlling the maximum pressure to be applied by limiting the extent of movement of the devices or of the cover.

It will also be clear that the gasket is relieved from excessive pressure by either type of fastening devices, whether stud and nut or bolt. Both are capable of bringing pressure upon the cover, with intervening spring elements, and using shoulder limitation of the distance to which they may be tightened.

It will be noted that what has been treated as a stud becomes in fact a bolt where a nut is threaded on the exposed threaded end of the stud and the nut is then fastened to the threaded end so as by a pin to prevent rotation.

The guard or protector shown in Figures 1 and 2 is inserted within the upper part of the through slot in the body and is held in position by any suitable means while its strips are welded to place, supplying a protection against inward slip of the packing during blowing down of the gauge. This construction is more cheaply constructed than is the integral form. Because of being separate metal it may be thinner than a corresponding integral construction would be.

In view of my invention and disclosure variations and modifications to meet individual whim or particular need will doubtless become evident to others skilled in the art, to obtain all or part of the benefits of my invention without copying the structure shown, and I, therefore, claim all such in so far as they fall within the reasonable spirit and scope of my invention.

Having thus described my invention, what I claim as new and desire to secure by Letters Patent is:

1. A bolt assembly comprising a bolt threaded at one end, having a head at the other end, a body portion between the head and thread larger in diameter than the thread and at the thread end facing toward the thread to form a first shoulder, a reduced portion of the body adjacent the head to form a neck and a second shoulder spring cones loosely surrounding the neck and held in place by the head in one direction and by the body portion in the opposite direction to prevent withdrawal.

2. A stud, bolt and spring assembly consisting of a bolt having a smooth body portion, a shoulder and, at each end, a reduced threaded portion, spring means, and smaller in diameter than the smooth body portion, loosely mounted on one end, a threaded nut mounted upon the thread at the end at which the means are located and means to fix the nut in position on said end to retain the means in place.

3. A stud, bolt and nut as described in claim 2 with spring cones serving the function of the spring means.

4. A stud bolt and spring assembly comprising a bolt reduced in diameter and threaded at both ends and of larger body diameter between the threads than the outside diameters of the threads, having shoulders facing toward the threads, one adjacent each threaded end and a neck of smaller diameter than the one shoulder, adjacent said shoulder, spring cones loosely mounted within the neck, a nut on the thread adjacent the neck to limit movement of the cones and compress them and means for fixing the nut.

5. In a spring and bolt assembly, a stud threaded at both ends, the stud body portion between being larger than the outside diameter of either thread, a shoulder adjacent one thread to limit extent of insertion of the thread at that end, a nut located on the other thread, spaced lengthwise of the stud from said body portion to leave a neck between which is reduced in diameter with respect to the body portion, a pin passing through the nut and the stud within it, and holding the nut to the stud against rotation on the thread and a compression spring surrounding the neck and held by the nut and body portion against removal from the stud.

6. A bolt assembly threaded at one bolt end, having a head at the opposite end, a neck adjacent the head and an intervening bolt body portion between the neck and thread, of larger diameter than either, a shoulder adjacent the thread facing toward the thread to limit the insertion of the threaded end and compression spring means adapted to pass over the shoulder and the body and having an interior diameter approximating the largest diameter between the thread and head, whereby the compression spring means may be forced over the bolt from the thread end up to and into the neck position on the assembly but will be retained from accidental displacement from the neck position.

DAVID ROBERT YARNALL.